United States Patent
Miyoshi

(10) Patent No.: US 7,200,177 B2
(45) Date of Patent: Apr. 3, 2007

(54) MULTI-CARRIER TRANSMISSION APPARATUS, MULTI-CARRIER RECEPTION APPARATUS, AND MULTI-CARRIER RADIO COMMUNICATION METHOD

(75) Inventor: Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 820 days.

(21) Appl. No.: 10/380,222

(22) PCT Filed: Jul. 3, 2002

(86) PCT No.: PCT/JP02/06712

§ 371 (c)(1),
(2), (4) Date: Mar. 12, 2003

(87) PCT Pub. No.: WO03/009504

PCT Pub. Date: Jan. 30, 2003

(65) Prior Publication Data

US 2004/0009783 A1 Jan. 15, 2004

(30) Foreign Application Priority Data

Jul. 13, 2001 (JP) .............................. 2001-214545

(51) Int. Cl.
*H04K 1/10* (2006.01)
*H04L 27/28* (2006.01)
(52) U.S. Cl. .................. 375/260; 375/135; 375/147
(58) Field of Classification Search ................. 375/134, 375/135, 146, 147, 260
See application file for complete search history.

(56) References Cited

U.S. PATENT DOCUMENTS 5,832,387 A * 11/1998 Bae et al. .................. 455/522

(Continued)

FOREIGN PATENT DOCUMENTS

JP 10155031 6/1998

(Continued)

OTHER PUBLICATIONS

Maeda et al. "A Delay Profile Information Based Subcarrier Power Control Combined With A Partial Non-Power Allocation Technique For OFDM/FDD Systems" Personal, Indoor and Mobile Radio Communications, 2000. PIMRC 2000. The 11th IEEE International Symposium, vol. 2, Sep. 18-21, 2000 pp. 1380-1384.*

(Continued)

Primary Examiner—Jay K. Patel
Assistant Examiner—Curtis Odom
(74) Attorney, Agent, or Firm—Stevens, Davis, Miller & Mosher, LLP

(57) ABSTRACT

A subcarrier transmission ON/OFF control system based on an MC-CDMA system capable of improving information transmission efficiency and reception performance while keeping the number of transmission bits constant. Furthermore, a subcarrier transmit power control system based on an MC-CDMA system or OFDM system capable of improving information transmission efficiency and reception performance. The former system based on the MC-CDMA system does not carry out transmission through subcarriers of low reception quality, with no transmit power assigned (transmission OFF), assigns the corresponding transmit power to subcarriers with transmit power assigned (transmission ON) and carries out transmission (subcarrier transmission ON/OFF control) The latter system based on the MC-CDMA system or OFDM system carries out transmission according to a reception level of each subcarrier on the receiving side, with greater transmit power assigned to subcarriers with higher reception levels and smaller transmit power assigned to subcarriers with lower reception levels (subcarrier reverse transmit power control).

24 Claims, 8 Drawing Sheets

U.S. PATENT DOCUMENTS

| | | | |
|---|---|---|---|
| 6,275,522 B1 * | 8/2001 | Johnson et al. | 375/224 |
| 6,721,569 B1 * | 4/2004 | Hashem et al. | 455/450 |
| 7,039,120 B1 * | 5/2006 | Thoumy et al. | 375/275 |

FOREIGN PATENT DOCUMENTS

| | | |
|---|---|---|
| JP | 11068630 | 3/1999 |
| JP | 11163822 | 6/1999 |
| JP | 11317723 | 11/1999 |
| JP | 2000358008 | 12/2000 |
| JP | 2001144724 | 5/2001 |

OTHER PUBLICATIONS

T. Yoshiki, et al.; "Performance of a Multilevel Transmit Power Control Scheme for the OFDM Subcarrier Adaptive Modulation System", Technical Report of IEICE, SSE2000-71, RCS2000-06(2000-07), pp. 63-67 with English Abstract.

N. Maeda, et al.; "Performance of the Delay Profile Information Channel based Subcarrier Transmit Power Control Technique for OFDM/FDD Systems", Transaction of Institute of Electronics, Information and Communication Engineers, B, vol. J84-B, No. 2, Feb. 2001, pp. 205-213 with partial English translation.

* cited by examiner

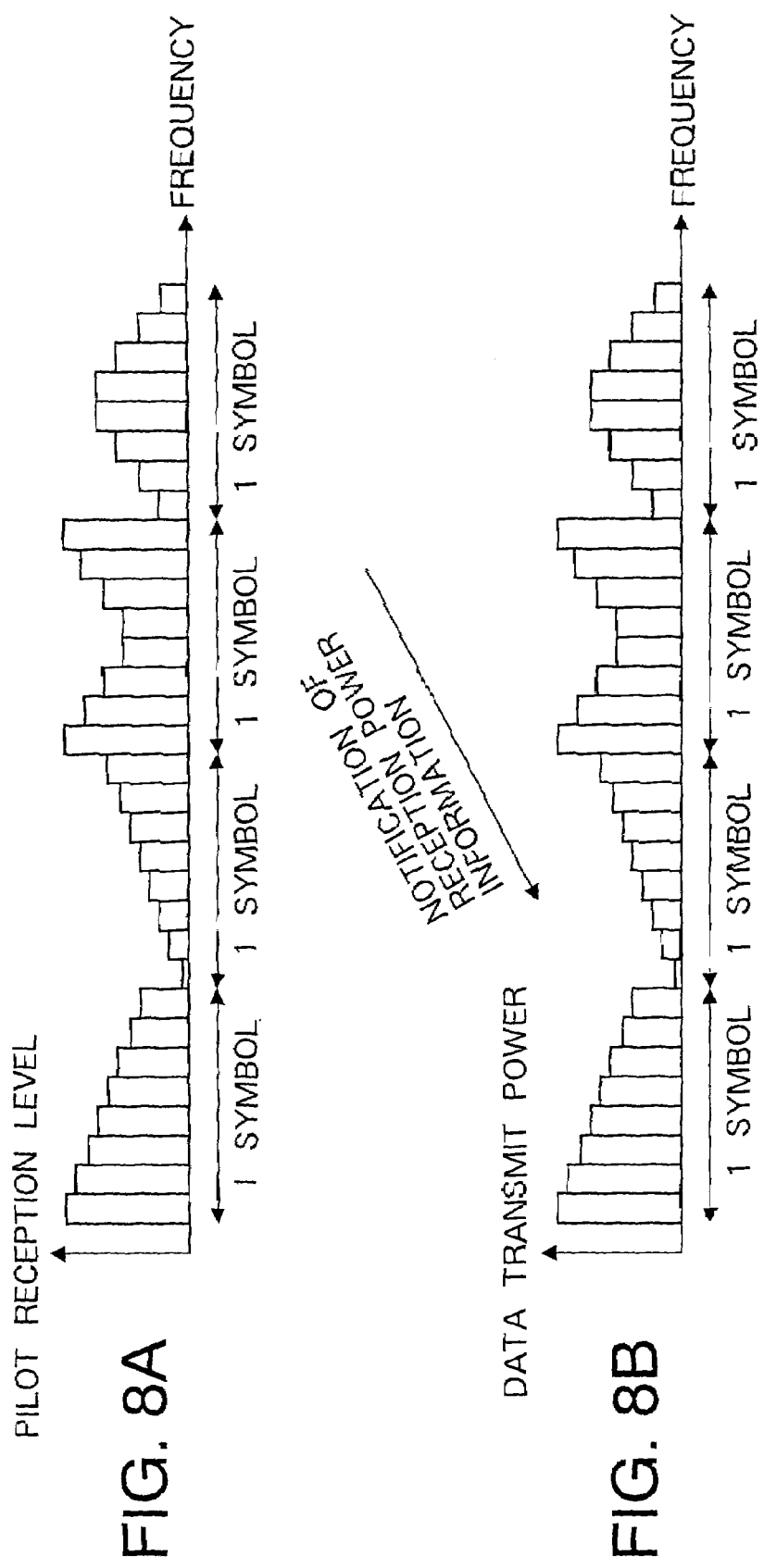

MULTI-CARRIER TRANSMISSION APPARATUS, MULTI-CARRIER RECEPTION APPARATUS, AND MULTI-CARRIER RADIO COMMUNICATION METHOD

TECHNICAL FIELD

The present invention relates to a transmission/reception apparatus, and more particularly, to a multicarrier transmission apparatus, multicarrier reception apparatus and multicarrier radio communication method.

BACKGROUND ART

In a radio communication, a mobile communication in particular, not only voice but also various types of information such as images and data are becoming objects of transmission in recent years. With anticipation of increasing demands for transmission of a variety of contents in the future, it is estimated that the need for more reliable and faster transmission will be further increased. However, when high-speed transmission is carried out in mobile communications, influences of delay signals caused by multipaths will grow to such an extent that they are no longer negligible and the transmission characteristic will deteriorate due to frequency selective fading.

As one of technologies for coping with frequency selective fading, a multicarrier (MC) modulation system such as an OFDM (Orthogonal Frequency Division Multiplexing) system is attracting attention. The multicarrier modulation system is a technology for transmitting data using a plurality of carriers (subcarriers) whose transmission rate is suppressed to an extent that frequency selective fading is prevented and thereby achieving high-speed transmission as a result. The OFDM system in particular is a system with the highest frequency utilization efficiency among multicarrier modulation systems because a plurality of subcarriers in which data is arranged are orthogonal to one another and it is also a system that can be implemented in a relatively simple hardware configuration, and therefore the OFDM system is a focus of particular attention and under study from various angles.

Examples of such studies include "Performance of a Multilevel Transmit Power Control Scheme for the OFDM Subcarrier Adaptive Modulation System" (by Yoshiki, Sanpei and Morinaga, TECHNICAL REPORT OF IEICE, SSE2000-71, RCS2000-60 (2000-07), pp.63–68) and "Performance of the Delay Profile Information Channel based Subcarrier Transmit Power Control Technique for OFDM/FDD Systems" (by Maeda, Sanpei and Morinaga, Transactions of Institute of Electronics, Information and Communication Engineers, B, Vol. J84-B, No. 2, pp. 205–213 (February 2001)).

Here, a base station is designed to improve the sensitivity of its receiver by controlling transmit power so that the reception situation of each subcarrier becomes constant as shown in FIG. 1A through FIG. 1C (hereinafter referred to as "conventional system 1"). Furthermore, as shown in FIG. 2A and FIG. 2B, for example, during subcarrier transmit power control, control is performed in such a way as to prevent transmission using subcarriers of low reception quality in order to reduce transmit power (hereinafter referred to as "conventional system 2").

However, the above-described conventional system 1 and conventional system 2 have problems as follows.

First, the conventional system 1 gives greater energy to subcarriers whose power decreases in a propagation path during transmission and gives smaller energy to subcarriers whose power increases in a propagation path during transmission (see FIG. 1A through FIG. 1C), which results in poor efficiency and puts a certain limit on improvement of the reception performance.

Moreover, since the conventional system 1 carries out transmit power control for each subcarrier, it is necessary to send a reference level of a transmission signal for every subcarrier when carrying out multi-value modulation such as QAM.

On the other hand, in order to demodulate reception information, the conventional system 2 requires a base station to send position information of subcarriers not engaged in transmission (that is, ones not assigned transmit power) to a mobile station separately, which requires relatively large transmit power which is not used for transmission of information. Moreover, since the transmit power is relatively large, the signal may cause interference with another cell.

Moreover, according to the conventional system 2, when there are subcarriers not engaged in transmission, the number of bits that can be transmitted may be decreased, preventing information from being transmitted correctly. For example, for a portion R of subcarriers #1 to #7 shown in FIG. 2B, there are too few transmission carriers to demodulate information correctly. To improve this, the conventional system 2 reduces the number of transmission bits by puncturing, but puncturing increases a coding rate and thereby reduces the error correcting performance.

Furthermore, the conventional system 2 turns OFF transmission by subcarriers of low reception quality, which reduces total transmit power and reduces the information transmission efficiency.

Moreover, a system combining an OFDM system and a CDMA (Code Division Multiple Access) system (referred to as "MC (multicarrier)-CDMA system" or also as "OFDM-CDMA system," but referred to as "MC-CDMA system" here) is recently a focus of particular attention as an access system to implement faster transmission. Here, the CDMA system is one of spread spectrum systems which is another technology for coping with frequency selective fading which improves interference resistance by directly spreading information of each user on the frequency axis using a spreading code specific to each user and thereby obtaining spreading gain. The MC-CDMA system will be described in detail later.

When, for example, the above-described conventional system 2 is simply applied to this MC-CDMA system, the following additional problem occurs:

That is, according to the conventional system 2, subcarriers not to be involved in transmission are selected from among all subcarriers, and therefore if transmission of all spreading chips of a certain symbol in the MC-CDMA system is turned OFF, the symbol will no longer be transmitted completely, and as a result the performance deteriorates.

Moreover, if transmission OFF control is simply performed in the MC-CDMA system, the orthogonality of a transmission signal with multiplexed spreading codes will be completely destroyed and a signal being sent using a different spreading code will have completely the same signal waveform, preventing the receiving side from separating those signals.

DISCLOSURE OF INVENTION

It is an object of the present invention to provide a multicarrier transmission apparatus, multicarrier reception apparatus and multicarrier radio communication method based on a subcarrier transmission ON/OFF control system capable of improving the information transmission efficiency and reception performance while maintaining the number of transmission bits in an MC-CDMA system.

It is another object of the present invention to provide a multicarrier transmission apparatus, multicarrier reception apparatus and multicarrier radio communication method based on a subcarrier transmit power control system capable of improving the information transmission efficiency and reception performance in an MC-CDMA system.

It is a further object of the present invention to provide a multicarrier transmission apparatus, multicarrier reception apparatus and multicarrier radio communication method based on a subcarrier transmit power control system capable of improving the information transmission efficiency and reception performance in an OFDM system.

A multicarrier transmission apparatus according to an aspect of the present invention is a multicarrier transmission apparatus that carries out radio communication by spreading signals in a frequency axis direction, including an acquisition section that acquires assignment presence/absence information on whether transmit power is assigned to each subcarrier or not and an assignment section that assigns transmit power for subcarriers with no transmit power assigned, to subcarriers with transmit power assigned, based on the assignment presence/absence information acquired by the acquisition section. The subcarriers with no transmit power assigned are a preset number (P) of subcarriers of relatively low reception quality for each symbol among subcarriers to which signals of chins corresponding in number to a predetermined spreading factor (N) are respectively assigned obtained by spreading each symbol with the predetermined spreading factor in the frequency axis direction and the subcarriers with transmit power assigned are transmitted with transmit power multiplied by $N/(N-P)$ times.

In the above-described multicarrier transmission apparatus, the acquisition section preferably includes a reception section that receives reception quality information on the reception quality of each subcarrier estimated on the receiving side and a decision section that decides the assignment presence/absence information based on the reception quality information received by the reception section (case 1). Furthermore, the acquisition section preferably includes a reception section that receives the assignment presence/absence information decided on the receiving side (case 2).

A multicarrier reception apparatus according to another aspect of the present invention is a multicarrier reception apparatus that carries out radio communication with the multicarrier transmission apparatus in the above case 1, including an estimation section that estimates reception quality information on the reception quality of each subcarrier and a transmission section that transmits the reception quality information estimated by the estimation section.

A multicarrier reception apparatus according to a further aspect of the present invention is a multicarrier reception apparatus that carries out radio communication with the multicarrier transmission apparatus in the above case 2, including an estimation section that estimates reception quality information on the reception quality of each subcarrier, a decision section that decides assignment presence/absence information on whether transmit power is assigned to each subcarrier or not based on the reception quality information estimated by the estimation section and a transmission section that transmits the assignment presence/absence information decided by the decision section.

A multicarrier radio communication method according to a still further aspect of the present invention is a multicarrier radio communication method for a multicarrier transmission apparatus that carries out radio communication by spreading signals in a frequency axis direction, including an acquisition step of acquiring assignment presence/absence information on whether transmit power is assigned to each subcarrier or not and an assignment step of assigning transmit power for subcarriers with no transmit power assigned, to subcarriers with transmit power assigned, based on the assignment presence/absence information acquired in the acquiring step.

In the above-described multicarrier radio communication method, the acquisition step preferably includes a reception step of receiving reception quality information on the reception quality of each subcarrier estimated on the receiving side and a decision step of deciding the assignment presence/absence information based on the reception quality information received in the reception step (case 1a). Furthermore, the acquisition step preferably includes a reception step of receiving the assignment presence/absence information decided on the receiving side (case 2a).

A multicarrier radio communication method according to a still further aspect of the present invention is a multicarrier radio communication method for a multicarrier reception apparatus that carries out radio communication with a multicarrier transmission apparatus that uses the multicarrier radio communication method in the above case 1a, including an estimation step of estimating reception quality information on the reception quality of each subcarrier and a transmission step of transmitting the reception quality information estimated in the estimation step.

A multicarrier radio communication method according to a still further aspect of the present invention is a multicarrier radio communication method for a multicarrier reception apparatus that carries out a radio communication with a multicarrier transmission apparatus that uses the multicarrier radio communication method in the above case 2a, including an estimation step of estimating reception quality information on the reception quality of each subcarrier, a decision step of deciding assignment presence/absence information on whether transmit power is assigned to each subcarrier or not based on the reception quality information estimated in the estimation step and a transmission step of transmitting the assignment presence/absence information decided in the decision step.

A multicarrier transmission apparatus according to a still further aspect of the present invention is a multicarrier transmission apparatus that carries out radio communication by spreading signals in a frequency axis direction, including an acquisition section that acquires reception level information on a reception level of each subcarrier on the receiving side and a control section that controls transmit power of each subcarrier based on the reception level information acquired by the acquisition section so that subcarriers with higher reception levels have greater transmit power and subcarriers with lower reception levels have smaller transmit power.

A multicarrier reception apparatus according to a still further aspect of the present invention is a multicarrier reception apparatus that carries out radio communication with this multicarrier transmission apparatus, including a detection section that detects reception level information on the reception level of each subcarrier and a transmission section that transmits the reception quality information detected by the detection section.

A multicarrier radio communication method according to a still further aspect of the present invention is a multicarrier radio communication method for a multicarrier transmission apparatus that carries out radio communication by spreading signals in a frequency axis direction, including an acquisition step of acquiring reception level information on the reception level of each subcarrier on the receiving side and a control step of controlling transmit power of each subcarrier based on the reception level information acquired in the acquisition step so that subcarriers with higher reception levels have greater transmit power and subcarriers with lower reception levels have smaller transmit power.

A multicarrier radio communication method according to a still further aspect of the present invention is a multicarrier radio communication method for a multicarrier reception apparatus that carries out radio communication with a multicarrier transmission apparatus using this multicarrier radio communication method, including a detection step of detecting reception level information on a reception level of each subcarrier and a transmission step of transmitting the reception quality information detected in the detection step.

A multicarrier transmission apparatus according to a still further aspect of the present invention is a multicarrier transmission apparatus that carries out radio communication based on an OFDM system, including an acquisition section that acquires reception level information on a reception level of each subcarrier on the receiving side and a control section that controls transmit power of each subcarrier based on the reception level information acquired by the acquisition section so that subcarriers with higher reception levels have greater transmit power and subcarriers with lower reception levels have smaller transmit power.

A multicarrier reception apparatus according to a still further aspect of the present invention is a multicarrier reception apparatus that carries out radio communication with this multicarrier transmission apparatus, including a detection section that detects reception level information on a reception level of each subcarrier and a transmission section that transmits the reception quality information detected by the detection section.

A multicarrier radio communication method according to a still further aspect of the present invention is a multicarrier radio communication method for a multicarrier transmission apparatus that carries out radio communication based on an OFDM system, including an acquisition step of acquiring reception level information on a reception level of each subcarrier on the receiving side and a control step of controlling transmit power of each subcarrier based on the reception level information acquired in the acquisition step so that subcarriers with higher reception levels have greater transmit power and subcarriers with lower reception levels have smaller transmit power.

A multicarrier radio communication method according to a still further aspect of the present invention is a multicarrier radio communication method for a multicarrier reception apparatus that carries out radio communication with a multicarrier transmission apparatus using this multicarrier radio communication method, including a detection step of detecting reception level information on a reception level of each subcarrier and a transmission step of transmitting the reception quality information detected in the detection step.

BRIEF DESCRIPTION OF DRAWINGS

FIG. 8A illustrates a subcarrier reverse transmit power control system according to this embodiment and shows an example of a relationship between frequency and pilot reception levels;

FIG. 8B also illustrates a subcarrier reverse transmit power control system according to this embodiment and shows an example of a relationship between frequency and data transmit power;

BEST MODE FOR CARRYING OUT THE INVENTION

An essence of the present invention is to carry out transmission based on an MC-CDMA system, avoiding transmission through subcarriers of low reception quality with no transmit power assigned (transmission OFF) and assigning the corresponding transmit power to subcarriers with transmit power assigned (transmission ON) (subcarrier transmission ON/OFF control). Another essence of the present invention is to carry out transmission based on an MC-CDMA system or OFDM system, according to the reception levels of subcarriers on the receiving side, with greater transmit power assigned to subcarriers with higher reception levels and smaller transmit power assigned to subcarriers with lower reception levels (subcarrier reverse transmit power control).

With reference now to the attached drawings, embodiments of the present invention will be explained in detail below.

(Embodiment 1)

Figure 3:
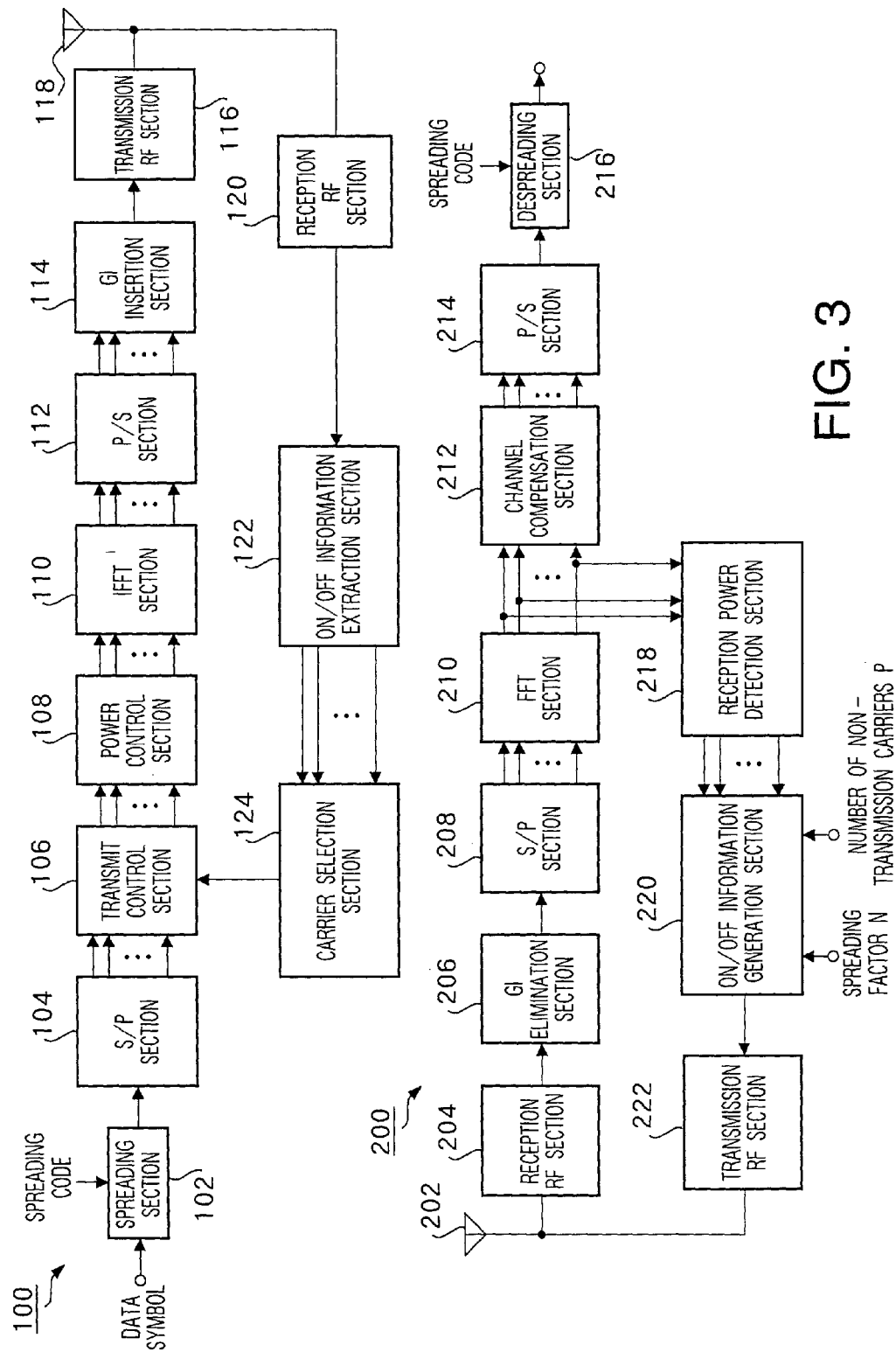
FIG. 3 is a block diagram showing configurations of a multicarrier transmission apparatus and a multicarrier reception apparatus according to Embodiment 1 of the present invention.

FIG. 3 is a block diagram showing configurations of a multicarrier transmission apparatus and a multicarrier reception apparatus according to Embodiment 1 of the present invention.

The multicarrier transmission apparatus (hereinafter simply referred to as "transmitter") 100 shown in FIG. 3 is provided with a spreading section 102, a serial/parallel conversion (S/P) section 104, a transmission control section 106, a power control section 108, an inverse fast Fourier transform (IFFT) section 110, a parallel/serial conversion (P/S) section 112, a guard interval (GI) insertion section 114, a transmission RF section 116, a transmission/reception duplex antenna 118, a reception RF section 120, an ON/OFF information extraction section 122 and a carrier selection section 124. The transmitter 100 is mounted, for example, on a base station in a mobile communication system.

On the other hand, the multicarrier reception apparatus (hereinafter simply referred to as "receiver") 200 shown in FIG. 3 is provided with a transmission/reception duplex antenna 202, a reception RF section 204, a guard interval (GI) insertion elimination section 206, a serial/parallel conversion (S/P) section 208, a fast Fourier transform (FFT) section 210, a channel compensation section 212, a parallel/serial conversion (P/S) section 214, a despreading section 216, a reception power detection section 218, an ON/OFF information generation section 220 and a transmission RF section 222. The receiver 200 is mounted, for example, on a mobile station apparatus in a mobile communication system.

The transmitter 100 and the receiver 200 constitute, for example, an MC-CDMA-based transmitter/receiver.

Figure 4:
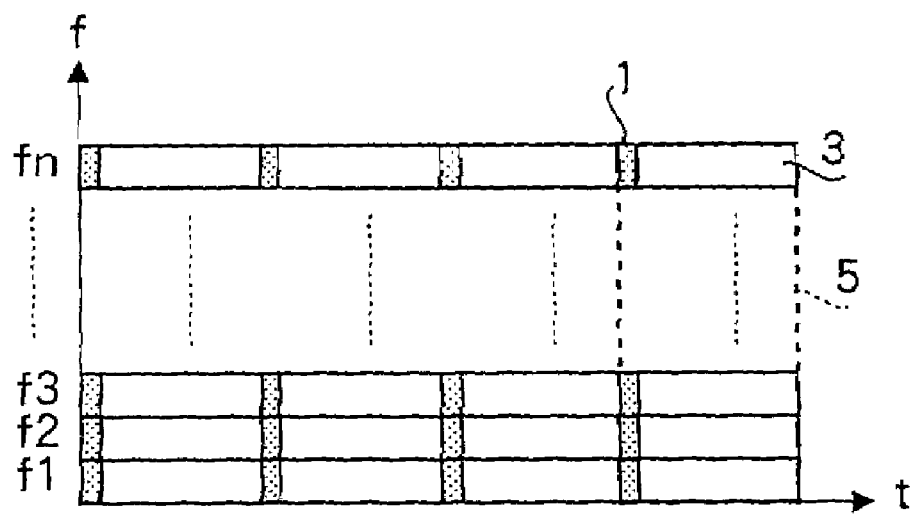
FIG. 4 illustrates a state of an OFDM signal to be transmitted.
Figure 5:
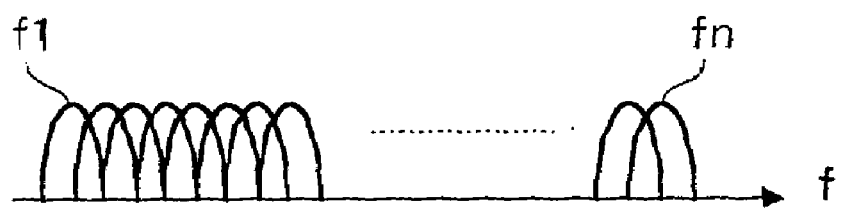
FIG. 5 illustrates a state of a subcarrier arrangement of an OFDM signal.

Here, the details of the MC-CDMA system will be explained using FIG. 4 and FIG. 5.

According to the MC-CDMA system, a signal is transmitted, divided into a plurality (e.g., 512) of carriers (subcarriers). More specifically, a transmission signal is spread in the frequency axis direction using a spreading code and code-multiplexed first. The code-multiplexed signal is serial/parallel-converted to parallel signals corresponding in number to the subcarriers. FIG. 4 shows a state of an OFDM signal to be transmitted (n: number of subcarriers). In the same figure, "1" denotes a guard interval, "3" denotes a chip, "5" denotes an OFDM symbol. In the example of FIG. 4, 4-symbol data is transmitted, spread n times. Each symbol is spread into n chips in the frequency axis direction. By the way, the number of subcarriers need not always coincide with the number of spreading codes. Furthermore, though not shown, the OFDM signal is provided with pilot signals (known signals) for each subcarrier.

Furthermore, according to the MC-CDMA system, each subcarrier is OFDM-modulated to become an orthogonal signal. Parallel signals after serial/parallel conversion are transmitted after being subjected to IFFT processing. Through the IFFT processing, the OFDM signal can maintain a state in which signals are orthogonal to one another among subcarriers as shown in FIG. 5. Here, that a signal is orthogonal means that a spectrum of a subcarrier signal does not affect other signals having different frequencies. When an OFDM modulation is performed, a guard interval is inserted into the OFDM symbol. With the guard interval inserted, it is possible to maintain orthogonality when only delay signals shorter than the guard interval exist.

Figure 2A:
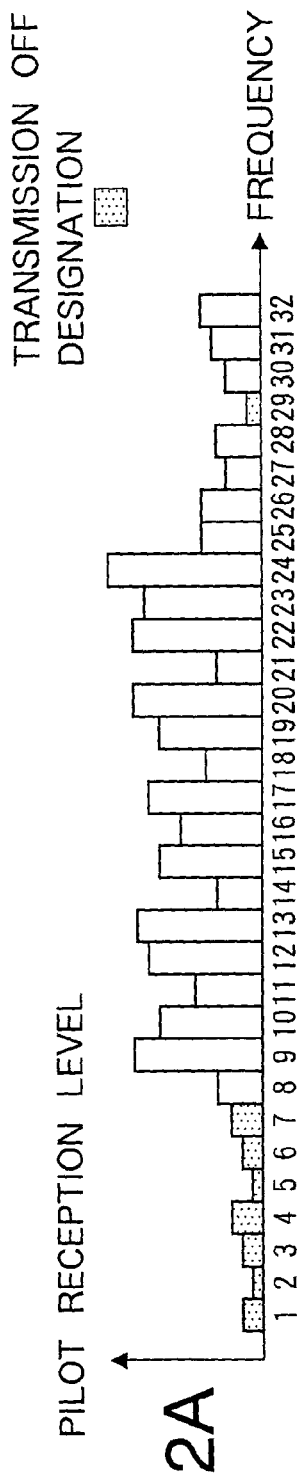
FIG. 2A illustrates a conventional subcarrier transmission ON/OFF control system and shows an example of a relationship between frequency and pilot reception levels.
Figure 2B:
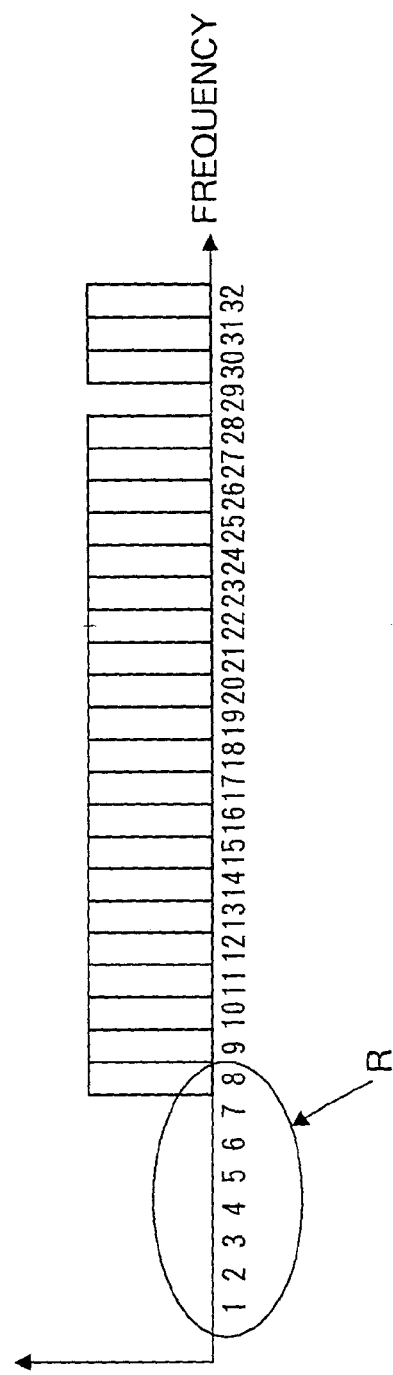
FIG. 2B also illustrates a conventional subcarrier transmission ON/OFF control system and shows an example of a relationship between frequency and data transmit power.
Figure 6:
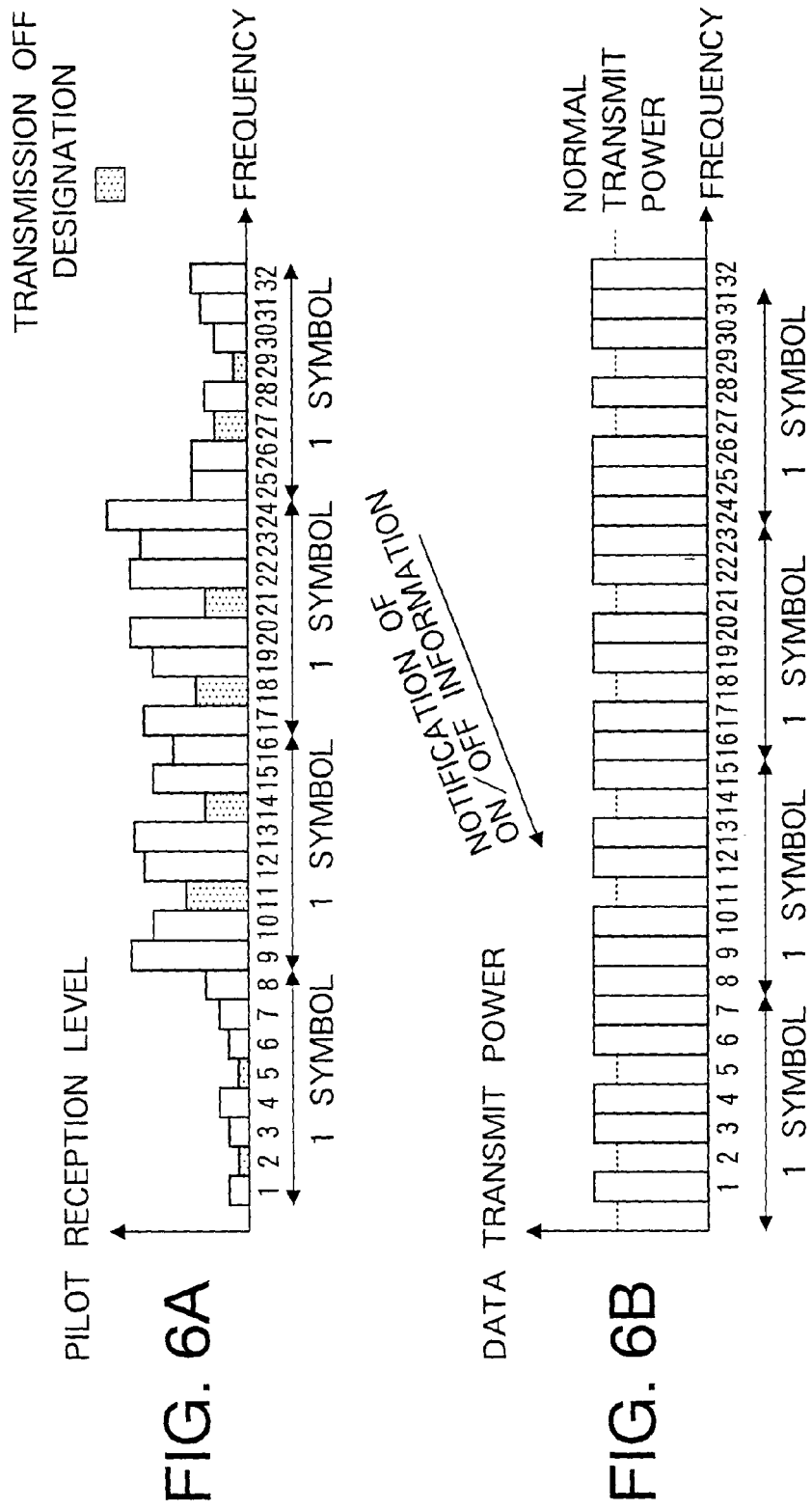
FIG. 6A illustrates a subcarrier transmission ON/OFF control system according to this embodiment and shows an example of a relationship between frequency and pilot reception levels.
FIG. 6B also illustrates a subcarrier transmission ON/OFF control system according to this embodiment and shows an example of a relationship between frequency and data transmit power.

Then, operations of the transmitter 100 and receiver 200 in the above-described configurations will be explained using FIG. 6A and FIG. 6B. FIG. 6A and FIG. 6B illustrate a subcarrier transmission ON/OFF control system according to this embodiment, which correspond to FIG. 2A and FIG. 2B showing a conventional subcarrier transmission ON/OFF control system (conventional system 2).

First, the spreading section 102 of the transmitter 100 spreads data symbols using their specific spreading codes with a spreading factor N in the frequency axis direction. The spread signal is output to the S/P section 104.

The S/P section 104 serial/parallel-converts the spread signal (serial signal) to parallel signals corresponding in number to the subcarriers and outputs the parallel signals obtained to the transmission control section 106.

The transmission control section 106 controls transmission ON/OFF of each subcarrier so that subcarriers with transmission OFF designation selected by the carrier selection section 124 (that is, subcarrier to which no transmit power is assigned) are not transmitted and the power control section 108 receives the control result from the transmission control section 106 and controls transmit power of each subcarrier so that a total power of subcarriers to be transmitted (transmit power) becomes equal to normal transmit power. That is, transmit power corresponding to subcarriers with transmission OFF designation with no transmit power assigned is assigned to subcarriers with transmission ON designation with transmit power assigned. At this time, assuming that P subcarriers among N subcarriers are not transmitted, transmit power of each subcarrier to be transmitted becomes, when equipartitioned, for example, N/(N−P) times normal transmit power (see FIG. 6B, for example). This causes the sum total of transmit power for all chips per one symbol to become equal to that in the case where transmission ON/OFF control is not carried out on each subcarrier, making it possible to avoid deterioration of the information transmission efficiency. The signal whose transmit power is controlled is output to the IFFT section 110.

The IFFT section 110 subjects the transmit-power-controlled signal to an inverse fast Fourier transform (IFFT), converts it from a frequency domain to a time domain and outputs it to the P/S section 112.

The P/S section 112 parallel/serial-converts the parallel signals after the IFFT processing and outputs the serial signal obtained to the GI insertion section 114.

The GI insertion section 114 inserts guard intervals into the output signal of the P/S section 112 to improve the characteristic against delays.

The signal after the guard intervals are inserted is subjected to predetermined radio processing such as up-conversion by the transmission RF section 116 and sent by radio from the antenna 118.

Then, the receiver 200 receives the signal sent by radio from the transmitter 100 through the antenna 202 and outputs the received signal to the reception RF section 204.

The reception RF section 204 applies predetermined radio processing such as down-conversion to the signal received through the antenna 202. The output signal (baseband signal) of the reception RF section 204 is output to the GI elimination section 206.

The GI elimination section 206 eliminates guard intervals from the output signal (baseband signal) of the reception RF section 204 and outputs the signal to the S/P section 208.

The S/P section 208 serial/parallel-converts the output signal (serial signal) of the GI elimination section 206 to parallel signals corresponding in number to the subcarriers and outputs the parallel signals to the FFT section 210.

The FFT section 210 subjects the output signals of the S/P section 208 to fast Fourier transform (FFT), converts the signals from a time domain to a frequency domain (that is, converts them to components for their respective subcarriers) and then outputs the signals to the channel compensation section 212 and reception power detection section 218.

At this time, the channel compensation section 212 estimates a channel based on pilot signals (known signals) included in the received signals and compensates the channel based on this estimated value. The signal after the channel compensation is output to the P/S section 214.

The P/S section 214 parallel/serial-converts the signals (parallel signals) after the channel compensation to a serial signal and outputs the serial signal obtained to the despreading section 216.

The despreading section 216 despreads the output signals of the P/S section 214 with the same specific spreading code as that on the transmitting side and obtains desired reception data.

On the other hand, the reception power detection section 218 receives the output signal of the FFT section 210 and detects the reception levels (reception power here) of pilot signals for each subcarrier signal. The detection result of the reception power detection section 218 is output to the ON/OFF information generation section 220 as reception quality information of each subcarrier.

The ON/OFF information generation section 220 generates information on whether transmit power is assigned to each subcarrier or not based on the detection result of the reception power detection section 218, that is, transmission ON/OFF information for each subcarrier. More specifically, when, for example, one symbol is spread over N subcarriers with a spreading factor N in the frequency axis direction, the ON/OFF information generation section 220 selects P subcarriers of relatively low reception quality from among the N subcarriers and sets them to transmission OFF. Here, P denotes the number of subcarriers not to be transmitted with no transmit power assigned and is a preset value. That is, in this case, the number of subcarriers (P) to be set to transmission OFF is preset and P subcarriers of lower reception quality are selected from among the N-chip signals obtained by spreading one symbol with a spreading factor N and set to transmission OFF. This ensures that (N−P) subcarriers per symbol are sent, making it possible to eliminate symbols to be completely set to transmission OFF and thereby efficiently transmit information while keeping the number of transmission bits constant.

Thus, this embodiment selects subcarriers of relatively low reception quality. For example, in the example shown in FIG. 6A, subcarrier #11 is set to transmission OFF though it has better reception quality than subcarrier #28. This is because two subcarriers (P=2) with low reception levels are selected to be set to transmission OFF from among subcarriers #9 to #16 (N=8) which make up the second symbol.

In this case, the value of P is set to a value that satisfies the following Expression 1:

$$2^{(N-P-1)} \geq N \qquad \text{(Expression 1)}$$

This allows (N−P) subcarriers to combine N or more types of spreading codes, prevents signals spread by different spreading codes from having the same waveform and ensures that the receiving side separates signals with different spreading codes.

For example, in the case of quadruple spreading (N=4) P that satisfies, $2^{(4-P-1)} \geq 4$ is P<2, and therefore P=1, which means that only one subcarrier can be set to transmission OFF.

More specifically, in the case of quadruple spreading, suppose two subcarriers are set to transmission OFF. At this time, there are four codes 1111, 1100, 1001 and 1010 in quadruple spreading, but if two subcarriers are set to transmission OFF, these four codes become --11, --001--01 and --10, respectively. Thus, a signal obtained by spreading signal "1" using code 1 and another signal obtained by spreading signal "0" using code 2 become completely the same transmission signal and the receiving side cannot separate them.

On the other hand, in the case of quadruple spreading, suppose only one subcarrier is set to transmission OFF. At this time, there are four codes 1111, 1100, 1001 and 1010 in quadruple spreading, but if one subcarrier is set to transmission OFF, these four codes become -111, -100, -001 and -010, respectively. Thus, none of a total of 8 codes which include these 4 codes plus 4 codes -000, -011, -110 and -101 obtained by inverting these 4 codes coincides with any of other codes, which prevents data with different spreading codes from becoming the same signal during spreading. Therefore, when N=4, P<2 is the essential condition.

The output signal of the ON/OFF information generation section 220 (transmission ON/OFF information for each subcarrier) is subjected to predetermined radio processing such as up-conversion by the transmission RF section 222 and then sent by radio from the antenna 202.

Then, the transmitter 100 receives the signal sent by radio from the receiver 200 through the antenna 118 and outputs the signal to the reception RF section 120.

The reception RF section 120 applies predetermined radio processing such as down-conversion to the signal received through the antenna 118. The output signal (baseband signal) of the reception RF section 120 is output to the ON/OFF information extraction section 122.

The ON/OFF information extraction section 122 extracts transmission ON/OFF information for each subcarrier sent from the receiver 200 and notifies it to the carrier selection section 124.

Thus, this embodiment based on an MC-CDMA system does not carry out transmission through subcarriers of low reception quality, with no transmit power assigned (transmission OFF), assigns the corresponding transmit power to subcarriers with transmit power assigned (transmission ON), sends the subcarriers so that the total transmit power of the transmitter 100 becomes constant (see FIG. 6A and FIG. 6B), and can thereby improve the information transmission efficiency and reception performance while keeping the number of transmission bits constant.

By the way, in this embodiment, the receiver 200 decides transmission ON/OFF information for each subcarrier and requests the transmitter 100 for the transmission ON/OFF information, but the present invention is not limited to this.

The present invention may also be adapted so that the receiver reports reception quality information of each subcarrier to the transmitter and the transmitter decides transmission ON/OFF information for each subcarrier. In this case, the transmitter decides transmission ON/OFF information for each subcarrier, and therefore it is possible to reduce the amount of calculation at the receiver. When the receiver decides transmission ON/OFF information for each subcarrier as in the case of this embodiment, the transmission ON/OFF information for each subcarrier has a smaller amount of information than the reception quality information of each subcarrier, and therefore it is possible to reduce the amount of information from the receiver to the transmitter.

Furthermore, taking advantage of the fact that delay profiles of the uplink and downlink are almost the same, it is also possible to adapt the present invention so that the transmitter estimates the reception quality information of each subcarrier for transmission ON/OFF control using the delay profile information of the signal received from the receiver and decides transmission ON/OFF information for each subcarrier. In this case, there is no need for a feedback signal (transmission ON/OFF information for each subcarrier or reception quality information of each subcarrier) from the receiver to the transmitter and the transmitter alone can decide transmission ON/OFF information for each subcarrier.

Furthermore, according to this embodiment, the P value used by the ON/OFF information generation section 220 of the receiver 200 is preset, but the present invention is not limited to this. For example, the P value may also be changed adaptively. In this case, the P value may be set to an optimum value according to the transmission environment. Furthermore, the P value may also be sent from the transmitter to the receiver. In this case, the receiver can recognize that the power of the subcarrier sent is multiplied by N/(N−P) times, and therefore the receiver can recognize a reference level for QAM demodulation, etc., and thereby perform QAM demodulation.

Furthermore, according to this embodiment, the transmitter 100 is mounted on the base station, while the receiver 200 is mounted on the mobile station, but the present invention is not limited to this. For example, the transmitter 100 may also be mounted on the mobile station, while the receiver 200 may be mounted on the base station.

Furthermore, this embodiment has described the case where the present invention is applied to the MC-CDMA system, but the present invention is not limited to this and the present invention is also applicable to any multicarrier modulation system combined with a CDMA system.

(Embodiment 2)

Figure 7:
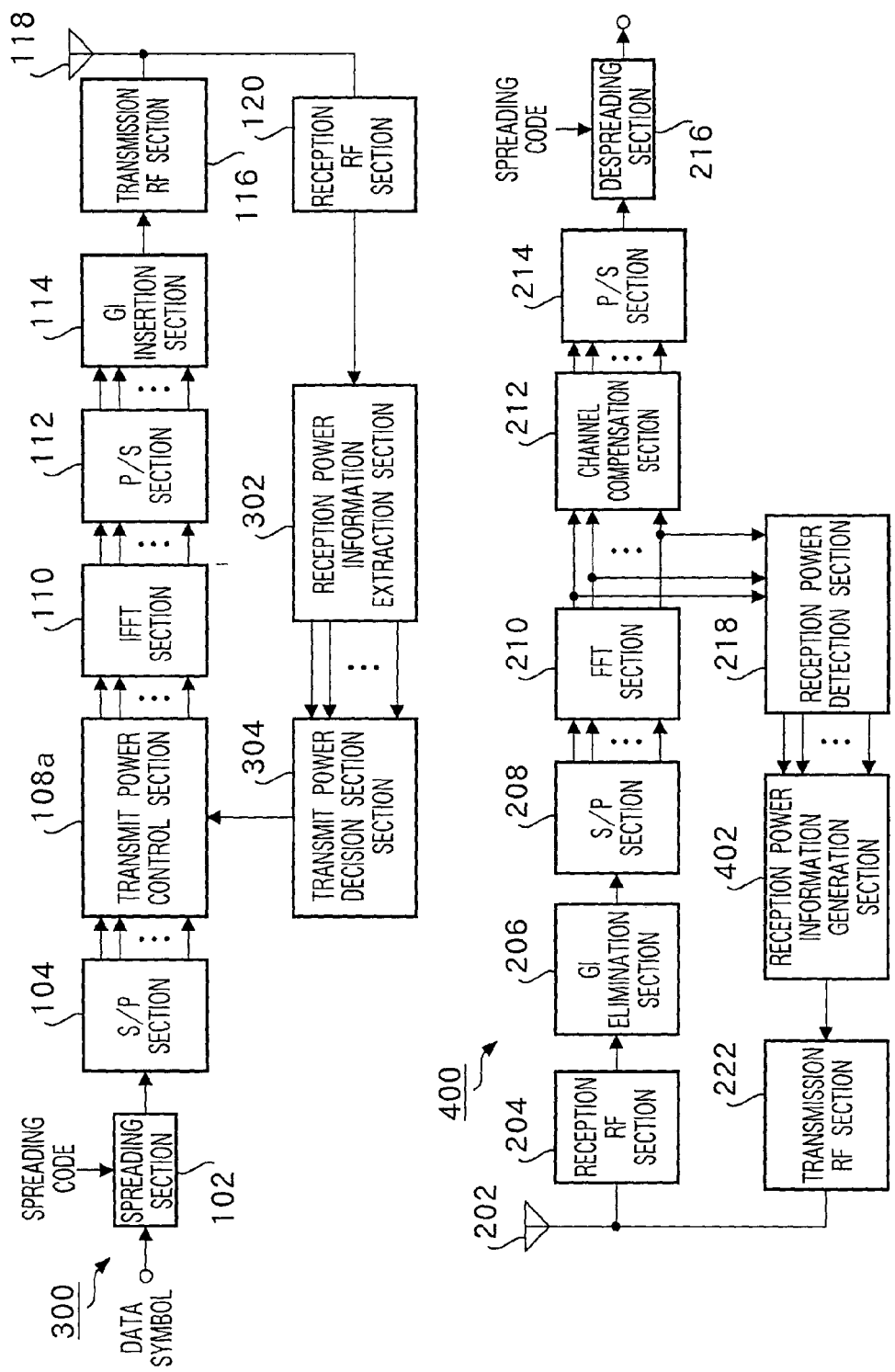
FIG. 7 is a block diagram showing configurations of a multicarrier transmission apparatus and a multicarrier reception apparatus according to Embodiment 2 of the present invention.

FIG. 7 is a block diagram showing configurations of a multicarrier transmission apparatus and a multicarrier reception apparatus according to Embodiment 2 of the present invention. The multicarrier transmission apparatus (transmitter) 300 and multicarrier reception apparatus (receiver) 400 have the same basic configurations as those of the multicarrier transmission apparatus (transmitter) 100 and multicarrier reception apparatus (receiver) 200 shown in FIG. 3, and therefore the same components are assigned the same reference numerals and explanations thereof will be omitted.

A feature of this embodiment consists in subcarrier transmit power control opposite the conventional system 1 (referred to "subcarrier reverse transmit power control" here), or more particularly, for example, this embodiment based on an MC-CDMA system carries out transmission according to a reception level of each subcarrier at the receiver 400 with subcarriers with higher reception levels assigned greater transmit power and subcarriers with lower reception levels assigned smaller transmit power. For this purpose, the transmitter 300 is provided with a transmit power control section 108a, a reception power information extraction section 302 and a transmit power decision section 304, and the receiver 400 is provided with a reception power information generation section 402.

Here, the transmitter 300 and the receiver 400 also constitute an MC-CDMA-based transmitter/receiver. Furthermore, for example, the transmitter 300 is mounted on a base station in a mobile communication system, while the receiver 400 is mounted on a mobile station apparatus in a mobile communication system.

Then, characteristic operations of the transmitter 300 and the receiver 400 will be explained using FIG. 8A and FIG. 8B. FIG. 8A and FIG. 8B illustrate a subcarrier reverse transmit power control system applied to this embodiment.

The transmit power control section 108a of the transmitter 300 controls transmit power of each subcarrier according to a notification from the receiver 400 so that subcarriers with greater reception power (that is, higher reception levels) are sent with greater transmit power and subcarriers with smaller reception power (that is, lower reception levels) are sent with smaller transmit power (see FIG. 8A and FIG. 8B). More specifically, assuming that reception power of a subcarrier #k is Hk, the transmit power of the subcarrier #k is set to power proportional to the reception power Hk so that a total value of transmit power of all subcarriers per one symbol becomes constant. At this time, the reception power information extraction section 302 extracts reception power information for each subcarrier sent from the receiver 400 and notifies it to the transmit power decision section 304, and the transmit power decision section 304 decides transmit power of each subcarrier based on the reception power information for each subcarrier and instructs it to the transmit power control section 108a.

Figure 1A:
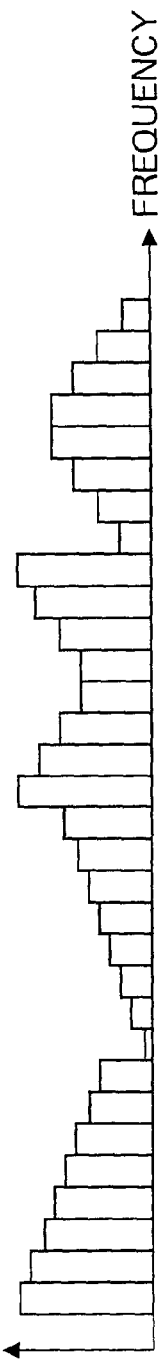
FIG. 1A illustrates a conventional subcarrier transmit power control system and shows an example of a relationship between frequency and pilot reception levels.
Figure 1B:
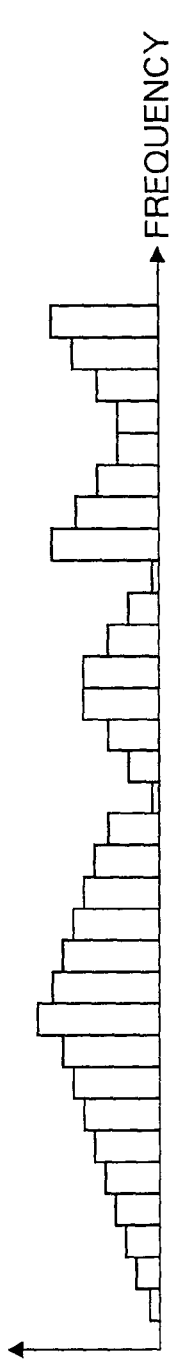
FIG. 1B also illustrates a conventional subcarrier transmit power control system and shows an example of a relationship between frequency and data transmit power.

By the way, in order to compensate for power variations in a propagation path (see FIG. 1C), the conventional system controls transmit power of subcarriers so that the transmit power becomes 1/Hk times, that is, a reciprocal of the reception power Hk (see FIG. 1A and FIG. 1B).

On the other hand, the reception power detection section 218 of the receiver 400 receives the output signal of the FFT section 210, detects the reception level of a pilot signal (here, reception power) and then outputs it to the reception power information generation section 402.

The reception power information generation section 402 generates reception power information for each subcarrier based on the detection result of the reception power detection section 218. More specifically, assuming that the reception power of a subcarrier #k is Hk, the value of this Hk is notified to the transmitter 300 as the reception power information.

At this time, it is also possible to normalize the reception power over a one-symbol section and notify information indicating a state of relative power in the one-symbol section. That is, assuming that a spreading factor is N, the normalized power information Hknorm is given by the following Expression 2:

$$Hknorm = \frac{Hk}{\left(\sum_{K=1}^{N} Hk\right)} \qquad \text{(Expression 2)}$$

This can reduce the dynamic range of notification information. It also allows the transmitter 300 to keep constant a total value of transmit power of all subcarriers that make up a certain one symbol.

Thus, this embodiment based on an MC-CDMA carries out transmission according to the reception levels (reception power) of subcarriers of the receiver 400, with greater transmit power assigned to subcarriers with greater reception power and smaller transmit power assigned to subcarriers with smaller reception power so that a total value of transmit power of all subcarriers per one symbol becomes constant, and can thereby control total transmit power per one symbol to a normal level, receive signals efficiently amplified in a propagation path and improve the information transmission efficiency and reception performance.

Figure 1C:
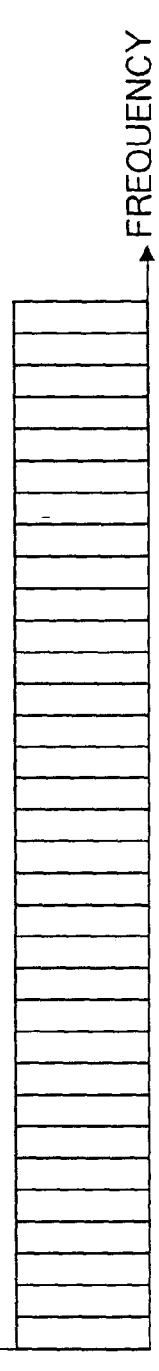
FIG. 1C also illustrates a conventional subcarrier transmit power control system and shows an example of a relationship between frequency and data reception power.
Figure 9A:
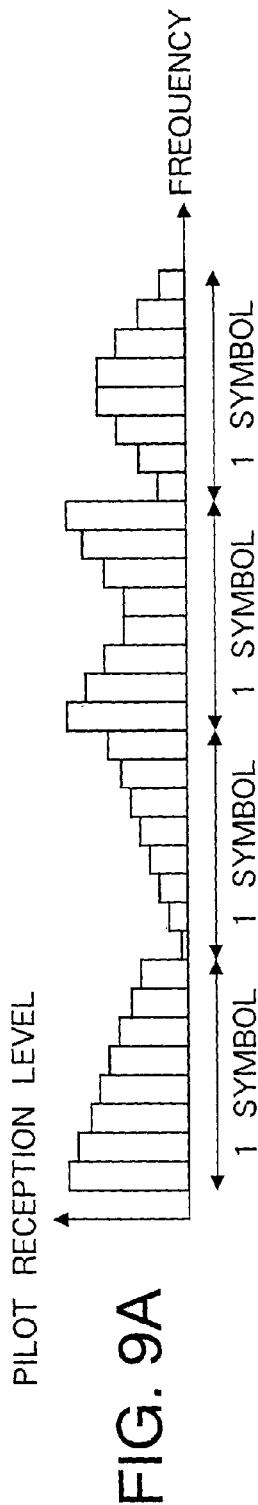
FIG. 9A illustrates another subcarrier reverse transmit power control system according to this embodiment and shows an example of a relationship between frequency and pilot reception levels.
Figure 9B:
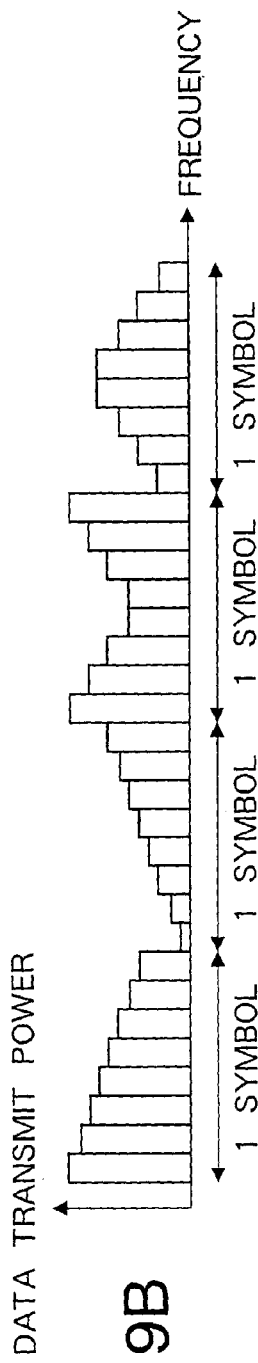
FIG. 9B also illustrates a further subcarrier reverse transmit power control system according to this embodiment and shows an example of a relationship between frequency and data transmit power.
Figure 9C:
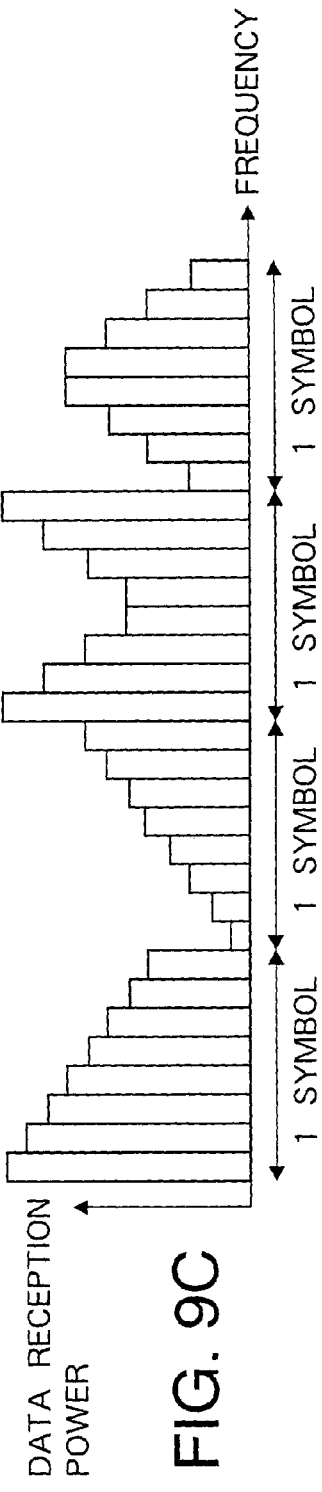
FIG. 9C illustrates a still further subcarrier reverse transmit power control system according to this embodiment and shows an example of a relationship between frequency and data reception power.

For example, when the system corresponding to this embodiment shown in FIG. 9A to FIG. 9C is compared to the conventional system shown in FIG. 1A to FIG. 1C, even if the transmit power remains the same (see FIG. 9B and FIG. 1B) for the same reception level information (see FIG. 9A and FIG. 1A), this embodiment can provide greater total reception power than that of the conventional system shown in FIG. 1C as shown in FIG. 9C.

By the way, this embodiment has described subcarrier reverse transmit power control based on an MC-CDMA system, but the system to which subcarrier reverse transmit power control is applicable is not limited to this. For example, the subcarrier reverse transmit power control is also applicable to any multicarrier modulation system combined with a CDMA system and the subcarrier reverse transmit power control is further applicable to a simple OFDM system, too.

As described above, the present invention can implement a subcarrier transmission ON/OFF control system based on an MC-CDMA system capable of improving information transmission efficiency and reception performance while keeping the number of transmission bits constant.

Furthermore, the present invention can also implement a subcarrier reverse transmit power control system based on an MC-CDMA system capable of improving information transmission efficiency and reception performance.

Furthermore, the present invention can also implement a subcarrier reverse transmit power control system based on an OFDM system capable of improving information transmission efficiency and reception performance.

This application is based on the Japanese Patent Application No. 2001-214545 filed on Jul. 13, 2001, entire content of which is expressly incorporated by reference herein.

INDUSTRIAL APPLICABILITY

The present invention is applicable to a multicarrier transmission apparatus and multicarrier reception apparatus to be mounted on a mobile station apparatus and base station apparatus, etc., in a mobile communication system.

What is claimed is:

1. A multicarrier transmission apparatus that carries out radio communication by spreading signals in a frequency axis direction, comprising:

an acquisition section that acquires assignment presence/absence information on whether transmit power is assigned to each subcarrier or not; and an assignment section that assigns transmit power for subcarriers with no transmit power assigned, to subcarriers with transmit power assigned, based on the assignment presence/absence information acquired by said acquisition section, wherein:

subcarriers with no transmit power assigned are a preset number (P) of subcarriers of relatively low reception quality for each symbol among subcarriers to which signals of chips corresponding in number to a predetermined spreading factor (N) are respectively assigned obtained by spreading each symbol with said predetermined spreading factor in the frequency axis direction and the subcarriers with transmit power assigned are transmitted with transmit power multiplied by N/(N−P) times.

2. A multicarrier transmission apparatus according to claim 1, wherein said acquisition section performs said assignment so that the total data transmit power is kept constant.

3. A multicarrier transmission apparatus according to claim 1, wherein the number (P) per one symbol of subcarriers with no transmit power assigned is adaptively changeable.

4. A multicarrier transmission apparatus according to claim 1, wherein the number (P) per one symbol of subcarriers with no transmit power assigned is set to a value that satisfies the following expression:

$$2^{(N-P-1)} \geq N.$$

5. A multicarrier transmission apparatus according to claim 1, wherein said acquisition section comprising:

a reception section that receives reception quality information on the reception quality of each subcarrier estimated on the receiving side; and a decision section that decides said assignment presence/absence information based on the reception quality information received by said reception section.

6. A multicarrier transmission apparatus according to claim 1, wherein said acquisition section comprises a reception section that receives said assignment presence/absence information decided on the receiving side.

7. A multicarrier transmission apparatus according to claim 1, wherein said acquisition section comprises:

a first estimation section that estimates a delay profile of a received signal;

a second estimation section that estimates the reception quality information on the reception quality of each subcarrier using the delay profile estimated by said first estimation section; and a decision section that decides said assignment presence/absence information based on the reception quality information estimated by said second estimation section.

8. A multicarrier reception apparatus that carries out radio communication with the multicarrier transmission apparatus according to claim 5, comprising:

an estimation section that estimates reception quality information on the reception quality of each subcarrier; and a transmission section that transmits the reception quality information estimated by said estimation section.

9. A multicarrier reception apparatus that carries out radio communication with a multicarrier transmission apparatus according to claim 6, comprising:

an estimation section that estimates reception quality information on the reception quality of each subcarrier;

a decision section that decides assignment presence/absence information on whether transmit power is assigned to each subcarrier or not based on the reception quality information estimated by said estimation section; and a transmission section that transmits the assignment presence/absence information decided by said decision section.

10. A base station apparatus comprising a multicarrier transmission apparatus according to claim 1.

11. A mobile station apparatus comprising a multicarrier reception apparatus according to claim 8.

12. A mobile station apparatus comprising a multicarrier reception apparatus according to claim 9.

13. A mobile station apparatus comprising a multicarrier transmission apparatus according to claim 1.

14. A base station apparatus comprising a multicarrier reception apparatus according to claim 8.

15. A base station apparatus comprising a multicarrier reception apparatus according to claim 9.

16. A multicarrier radio communication method for a multicarrier transmission apparatus that carries out radio communication by spreading signals in a frequency axis direction, comprising:

an acquisition step of acquiring assignment presence/absence information on whether transmit power is assigned to each subcarrier or not; and an assignment step of assigning transmit power for subcarriers with no transmit power assigned, to subcarriers with transmit power assigned, based on the assignment presence/absence information acquired in said acquisition step, wherein subcarriers with no transmit power assigned are a preset number (P) of subcarriers of relatively low reception quality for each symbol among subcarriers to which signals of chips corresponding in number to a predetermined spreading factor (N) are respectively assigned obtained by spreading each symbol with said predetermined spreading factor in the frequency axis direction and the subcarriers with transmit power assigned are transmitted with transmit power multiplied by N/(N−P) times.

17. A multicarrier radio communication method according to claim 16, wherein in said acquisition step, said assignment is carried out so that the total data transmit power is kept constant.

18. A multicarrier radio communication method according to claim 16, wherein the number (P) of subcarriers with no transmit power assigned per one symbol is adaptively changeable.

19. A multicarrier radio communication method according to claim 16, wherein the number (P) of subcarriers with no transmit power assigned per one symbol is set to a value that satisfies the following expression:

$$2^{(N-P-1)} \geq N.$$

20. A multicarrier radio communication method according to claim 16, wherein said acquisition step comprising:

a reception step of receiving reception quality information on the reception quality of each subcarrier estimated on the receiving side; and a decision step of deciding said assignment presence/absence information based on the reception quality information received in said reception step.

21. A multicarrier radio communication method according to claim 16, wherein said acquisition step comprises a reception step of receiving said assignment presence/absence information decided on the receiving side.

22. A multicarrier radio communication method according to claim 16, wherein said acquisition step comprises:

a first estimation step of estimating a delay profile of a received signal;

a second estimation step of estimating the reception quality information on the reception quality of each subcarrier using the delay profile estimated in said first estimation step; and a decision step of deciding said assignment presence/absence information based on the reception quality information estimated in said second estimating step.

23. A multicarrier radio communication method for a multicarrier reception apparatus that carries out radio communication with a multicarrier transmission apparatus using a multicarrier radio communication method according to claim 20, comprising:

an estimation step of estimating reception quality information on the reception quality of each subcarrier; and a transmission step of transmitting the reception quality information estimated in said estimation step.

24. A multicarrier radio communication method for a multicarrier reception apparatus that carries out radio communication with a multicarrier transmission apparatus using a multicarrier radio communication method according to claim 21, comprising:

an estimation step of estimating reception quality information on the reception quality of each subcarrier;

a decision step of deciding assignment presence/absence information on whether transmit power is assigned to each subcarrier or not based on the reception quality information estimated in said estimation step; and a transmission step of transmitting the assignment presence/absence information decided in said decision step.

* * * * *